J. THOMAS.
AUTOMATIC LAMP ADJUSTER.
APPLICATION FILED SEPT. 12, 1912.
1,081,522.
Patented Dec. 16, 1913.
2 SHEETS—SHEET 1.
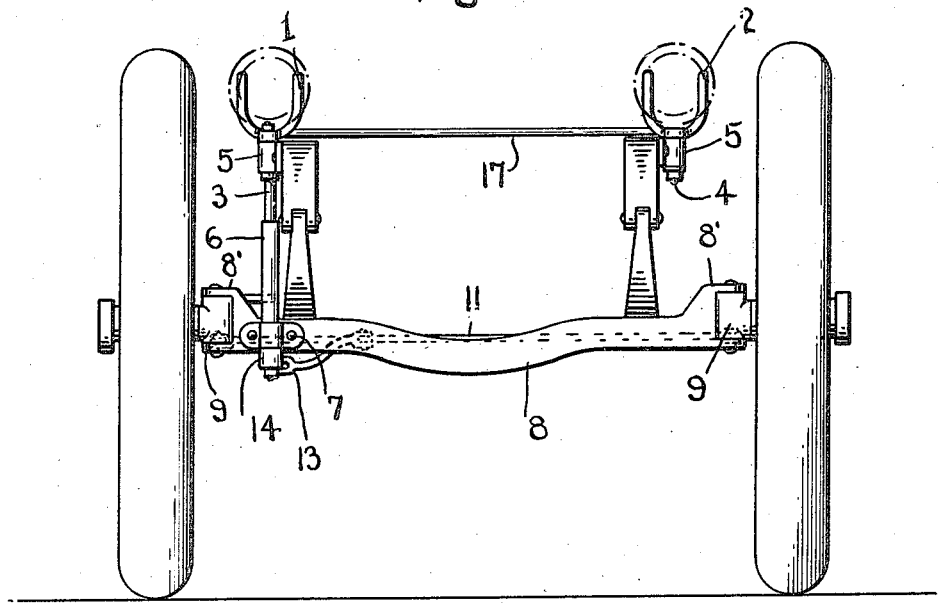
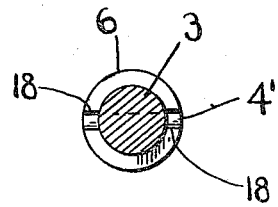
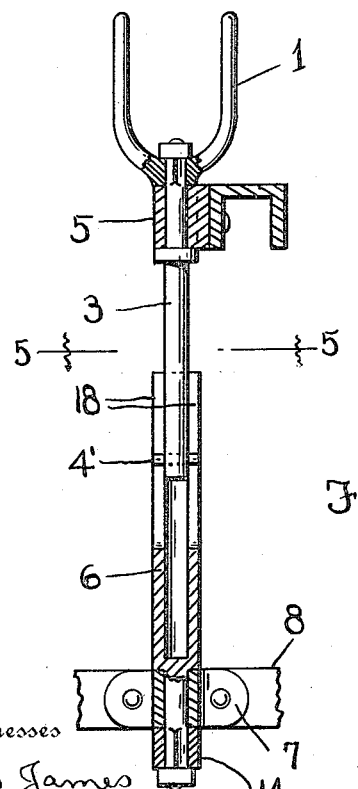
Inventor
John Thomas
Witnesses J. THOMAS.
AUTOMATIC LAMP ADJUSTER.
APPLICATION FILED SEPT. 12, 1912.
1,081,522. Patented Dec. 16, 1913.
2 SHEETS—SHEET 2.
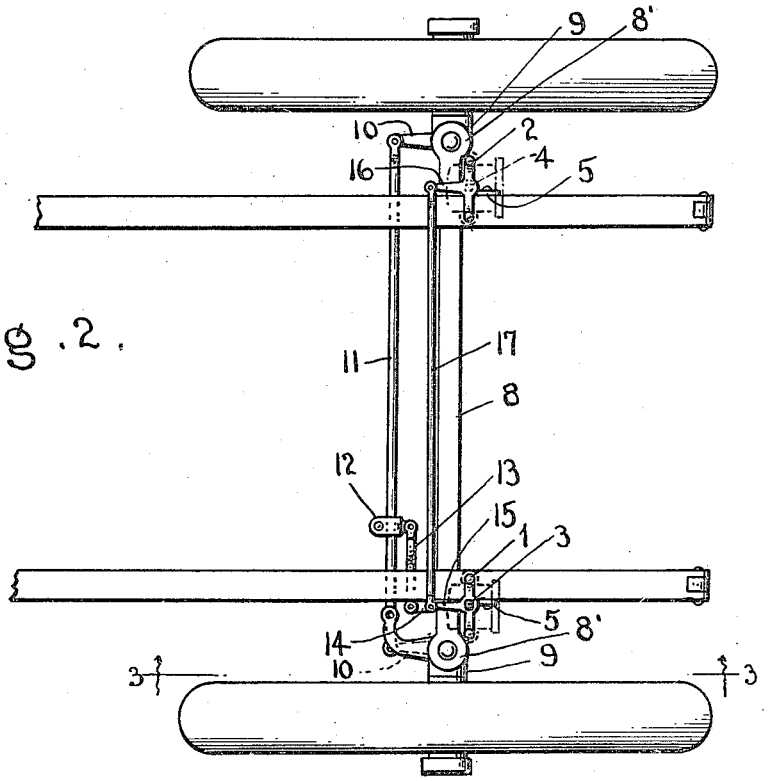
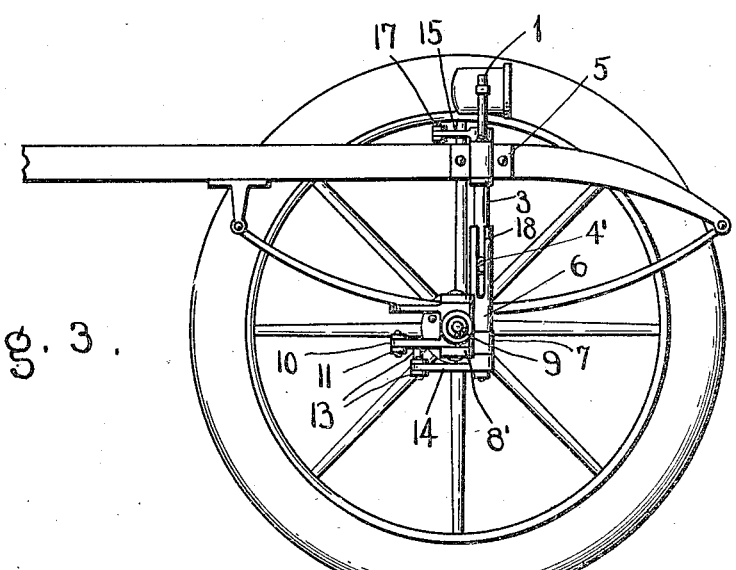

UNITED STATES PATENT OFFICE.

JOHN THOMAS, OF KINGMAN, INDIANA.

AUTOMATIC LAMP-ADJUSTER.

1,081,522.  Specification of Letters Patent.  Patented Dec. 16, 1913.

Application filed September 12, 1912. Serial No. 720,039.

*To all whom it may concern:*

Be it known that I, JOHN THOMAS, a citizen of the United States, residing at Kingman, in the county of Fountain and State of Indiana, have invented certain new and useful Improvements in Automatic Lamp-Adjusters; and I do declare the following to be a full, clear, and exact description of the invention, such as will enable others skilled in the art to which it appertains to make and use the same.

This invention relates to a device or attachment for automatically operating the head-lights of automobiles by the action of the steering gear in such a manner that the curves of a road may be illuminated as the course of the vehicle is changed.

The object of the invention is to produce an attachment which is simple in construction, durable and easy of attachment to the different makes of automobiles and other motor vehicles.

Another object of the invention is to provide means whereby the vertical movement of the body in relation to the running gear is compensated for and will not affect the movement of the lamps.

With these and other objects in view, the invention consists of certain novel features of construction, combination and arrangement of parts, as will be hereinafter more fully described and claimed.

In the accompanying drawings:—Figure 1 represents a front elevation of an automobile equipped with my improvement; Fig. 2 is a top plan view of the axle and springs of an automobile, showing this improvement applied; Fig. 3 is a transverse vertical section taken on the line 3—3 of Fig. 2; Fig. 4 is an enlarged detail vertical section through one of the lamp posts; and Fig. 5 is a horizontal section through the same post.

In the embodiment illustrated lamp forks 1 and 2 are shown provided with pivot stems or posts 3 and 4 journaled in bearings 5 secured to the side frames of the vehicle preferably on the outer sides thereof. The stem 3 is longer than stem 4 and fits in a sleeve or socket member 6, which is journaled at its lower end in a bearing 7 on the stationary front axle 8 for a purpose to be described.

The front axle 8 has stub axles 9 pivotally mounted in forks 8' at the ends of the axle 8, and on which the front wheels of the vehicle are journaled. Laterally extending arms 10 are fixed to the hubs of the stub axles 9 and extend in planes substantially at right angles to the stub axles. The free ends of these arms 10 are pivotally connected with a steering rod 11 by means of which said axles are caused to turn in unison one in one direction and the other in the opposite direction, said rod 11 being connected to any suitable means (not shown) for actuation by the steering wheel of the vehicle. A bearing member 12 is adjustably mounted on the rod 11 with which a link 13 is pivotally connected at one end. The other end of this link 13 is pivoted to an arm 14, which extends laterally from and is fixed to the sleeve 6 of the pivot stem 3 of the lamp fork 1 and by means of which said fork is turned simultaneously with the turning of the front or steering wheels of the vehicle in a direction to throw the rays of light from the lamp mounted on said fork 1 directly in the path of travel of said front wheels.

The forks 1 and 2 are provided with fixed laterally and rearwardly extending arms 15 and 16, the free ends of which are pivotally connected with a coupling rod 17, which causes the simultaneous turning of the lamp forks.

The sleeve or socket 6 has diametrically disposed open longitudinally extending slots 18 at its upper end which are slidably engaged with laterally extending studs 4' on the stem 3, said stem projecting into said socket 6 and being held by the studs 4' against lateral turning independent of the socket. The sliding connection of the socket 6 and the stem 3 compensates for all vertical motion of the body of the vehicle with reference to the running gear. It will thus be seen that the lamp carrying portions of the device can be readily removed and replaced for repairs or other purposes by simply disconnecting the bearing 5 carrying the stem 3 from the frame of the machine with the remaining portions of said device remaining in a position to readily receive said parts that have been removed when occasion requires it.

It will thus be readily seen that a slight lateral movement of the steering rod 11 will turn the stub axles which carry the front wheels of the vehicle and also the socket and stem connected with said rod. This turning of the socket and stem will also reciprocate the connecting rod 17 and thus turn the lamps on their pivot mountings simultaneously with the turning of the front wheels journaled on said axles 9.

Having thus described my invention, what I claim is:—

The herein described lamp-adjusting attachment for automobiles comprising an upright sleeve longitudinally slotted at its upper end and having a lateral arm at its lower end adapted to be connected with the steering mechanism for the front wheels of said automobile, a bearing for said sleeve adapted to be connected with the fixed portion of the front axle, bearings adapted to be attached to the automobile frame above its springs, one of them directly above the bearing on the axle, two lamp-forks whose stems are rotatably mounted in said last-named bearings and one of which extends down into and fits slidably within said sleeve, a stud in this stem engaging the slot in the sleeve and causing said parts to rotate in unison, and connections between the two stems for causing them to turn in unison in their bearings.

In testimony whereof I have hereunto set my hand in presence of two subscribing witnesses.

JOHN THOMAS.

Witnesses:
CHARLES R. DAVIS,
JOHN H. DAVIS.

Copies of this patent may be obtained for five cents each, by addressing the "Commissioner of Patents, Washington, D. C."